May 7, 1929.  W. D. HAMMOND  1,711,843
TREE COVERING TENT
Filed Jan. 31, 1928

Inventor
William D. Hammond
By Lyon & Lyon
Attorneys

Patented May 7, 1929.

1,711,843

UNITED STATES PATENT OFFICE.

WILLIAM D. HAMMOND, OF LOS ANGELES, CALIFORNIA.

TREE-COVERING TENT.

Application filed January 31, 1928. Serial No. 250,818.

This invention relates to a device for covering a tree and is useful in protecting a tree, such as a citrus tree, from frost and is useful when it is desired to fumigate the tree.

An object of the present invention is to provide a form of device for a tree which may be very readily installed in position and removed from the tree as desired, and a further object of the present invention is to provide a form of device for a tree which is simple and economical in construction.

Various further objects and advantages of the present invention will be understood from the description of a preferred form or example of a tree embodying the invention. For this purpose, reference is made to the accompanying drawings which illustrate the preferred form of device embodying the invention.

Figure 1:
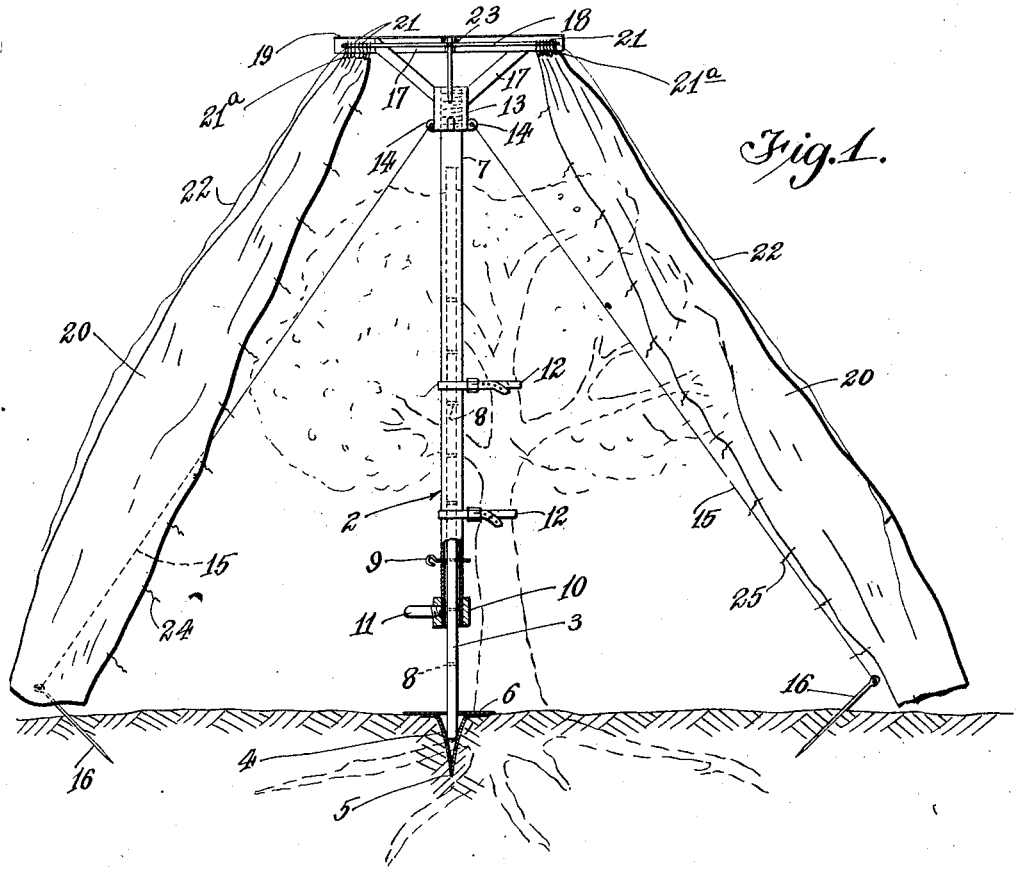
Figure 1 represents an elevation of the device in position covering a tree with the curtain partially rolled back and part of the curtain cut away.
Figures 2, 3:
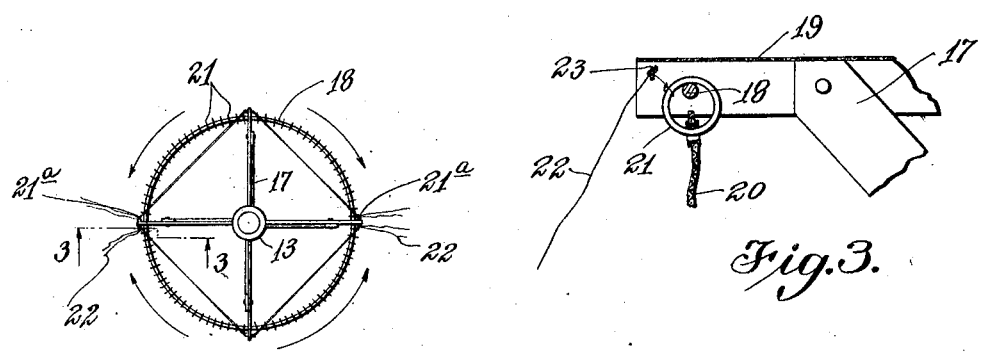
Figure 2 is plan view of the curtain carrying ring and spider of the device.
Figure 3 is a fragmentary section on the line 3—3 of Figure 2.

Referring to the drawings,—the device comprises a telescopic pole 2 including the pole member 3 which, at its lower end is provided with anchoring means 4 including a point 5 which may be driven into the ground for holding stationary the pole of the device, and the means 4 also includes a flat plate 6 which is adapted to hold the pole of the device in a vertical position. The telescopic pole of the device also includes a tubular pole member 7 and the tubular member 7 and pole member 3 are provided with a plurality of vertically spaced apart openings 8 through which a pin 9 may be inserted for adjusting the height of the pole. The tubular pole member 7 is also provided at its lower end with a collar 10 and handle 11 by means of which said member may be raised as desired. The pole of the device is also preferably provided with means, such as the straps 12, by which the pole may be secured or supported from a tree as indicated in Figure 1.

At its upper end the pole member 7 is provided with a collar 13 having webs 14 to which may be secured lines 15 for bracing the pole, the lines 15 being connected with spikes 16 as indicated.

The collar 13 forms a part of a spider including the bars 17 and the ring 18. The ring 18 serves as a curtain supporting member for the device and said ring may be covered with canvas or other material as indicated at 19.

20 indicates the side curtain of the device which, at its upper end, is secured in a suitable manner to rings 21 sliding upon the major supporting ring 18. The curtain 20 is preferably formed of two semi-circular portions, and the middle of each semi-circular portion is fixed to the ring as indicated at $21^a$. The free ends of the curtain portions have attached thereto lines 22 passing through rings 23 supported by the bar 17 most distantly spaced from the point $21^a$, which lines 22 serve as a means by which the curtain sections may be drawn into the closed position. The sides of the curtain sections are provided with suitable means 24 and 25 by which the curtain portions may be fastened or laced together.

With the device of the present invention the two curtain portions are drawn back against the points $21^a$ when it is desired to position the device over a tree. The spike 5 of the support of the device is then driven into the ground adjacent the base of the tree and the telescopic tent rod swung in through the branches of the tree and its height regulated. The rod is then fastened to the tree by the straps 12. Inasmuch as the curtain portions of the device can all be drawn to two points on the ring 18, the curtains may be readily held away from the tree branches during these operations. After installing the telescopic pole in position, it is then braced by the lines 15 and the lines 22 then pulled up to close the curtain around the tree. The device of the present invention is well suited for the purpose of defending the tree against frost or where it is desired to fumigate the tree.

While the particular form of the invention herein described is well adapted to carry out the objects of the invention, it is to be understood that various modifications and changes may be made in the invention without departing from the spirit of the invention, and the invention includes all such modifications and changes as come within the scope of the following appended claim.

I claim:

A tree covering device comprising, a vertical pole formed of telescopic members, one of said members carrying anchoring means for anchoring said pole in the ground, the other telescopic member providing at its upper end a circular curtain supporting ring, curtain portions slidably supported by said ring and movable into a collapsed position, and means for drawing said curtains from the collapsed to the extended position.

Signed at Los Angeles, California, this 23rd day of January, 1928.

WILLIAM D. HAMMOND.